United States Patent

[11] 3,625,886

[72] Inventor Manlio M. Mattia
  Ridley Park, Pa.
[21] Appl. No. 799,024
[22] Filed Feb. 13, 1969
[45] Patented Dec. 7, 1971
[73] Assignee Day & Zimmermann, Inc.
  Philadelphia, Pa.

[54] PROCESS FOR RECOVERING ORGANIC MATERIAL FROM AQUEOUS STREAMS
  4 Claims, 1 Drawing Fig.
[52] U.S. Cl. ..................................................... 210/32,
  203/41, 203/92, 210/40
[51] Int. Cl. ........................................................ B01d 3/38,
  B01d 15/06
[50] Field of Search ........................................... 203/92, 93,
  41; 210/26, 32, 34, 40, 340

[56] References Cited
UNITED STATES PATENTS

| | | | |
|---|---|---|---|
| 3,084,107 | 4/1963 | McMahon.................... | 203/93 X |
| 3,448,042 | 6/1969 | Mattia et al.................. | 210/26 |

*Primary Examiner*—Reuben Friedman
*Assistant Examiner*—Thomas G. Wyse
*Attorney*—Seidel, Gonda & Goldhammer

ABSTRACT: Apparatus and method for recovering organic compounds present in aqueous streams at concentrations between 50 and 5,000 parts per million is disclosed. The process is continuous in that alternate adsorbers are interchangeably used. Economic steam desorption of high-boiling compounds is permitted by use of a thermocompressor to recycle regenerating steam through the adsorbers. Steam condensing in a separator is kept to a minimum in order to obtain the highest possible organic content in the condensate.

PATENTED DEC 7 1971                              3,625,886
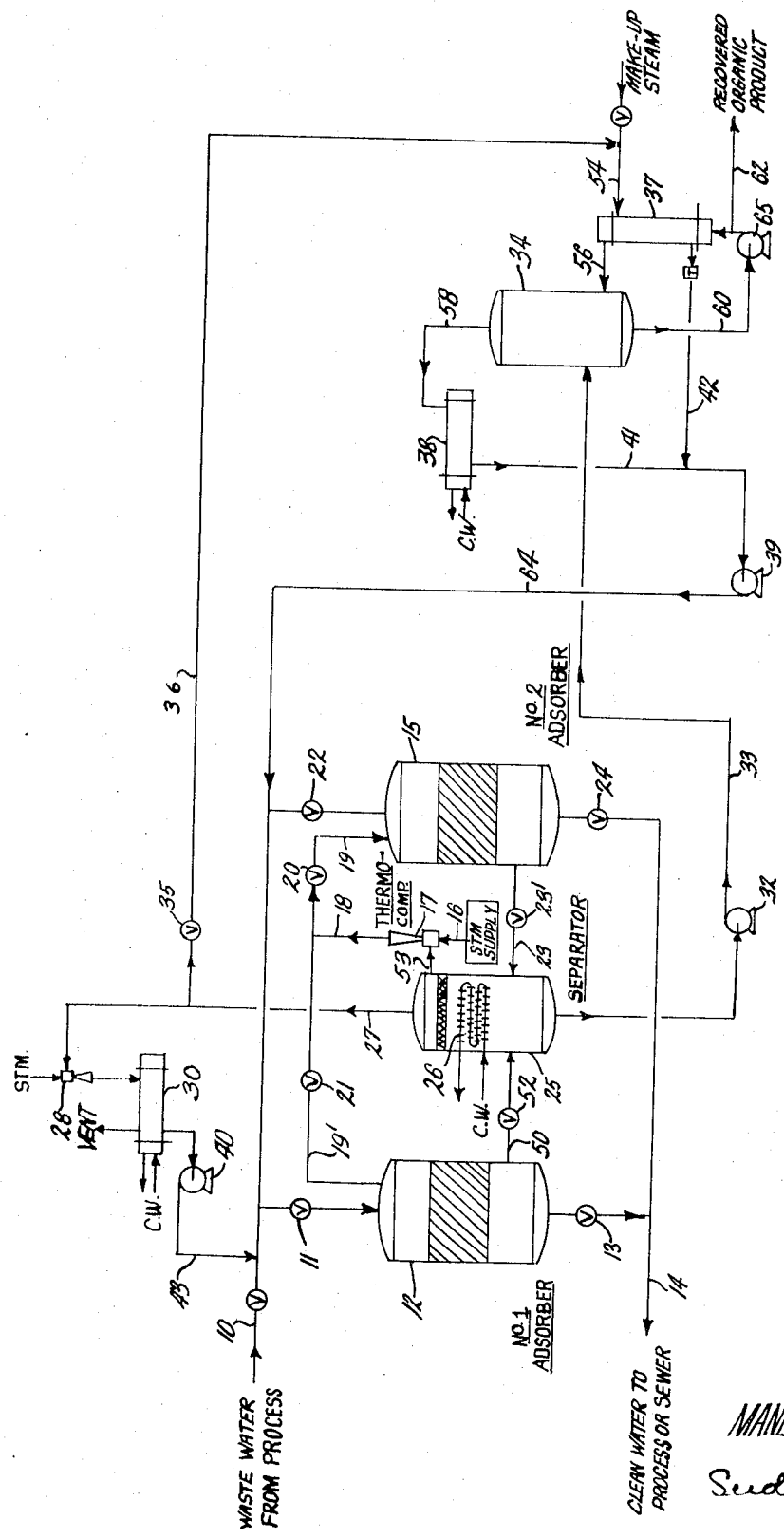
INVENTOR
MANLIO M. MATTIA
ATTORNEY

PROCESS FOR RECOVERING ORGANIC MATERIAL FROM AQUEOUS STREAMS

This invention relates to apparatus and method for recovering organic compounds from aqueous streams. The process is designed specifically for compounds with a normal boiling point above the boiling point of water, namely 212° F.

Low concentrations of relatively high boiling point compounds in effluent streams constitute one of our major industrial water pollution problems. These compounds frequently prevent reuse of water because they contribute to product contamination and/or lower operating efficiencies. The compounds are not volatile enough to recover by distillation and are too low in concentration to permit economic recovery by evaporation. Typical examples of such compounds which may be recovered by the present invention include ethylene glycol from polyester plant effluent streams, phenol from catalytic cracking operations, phenol in effluent streams from phenolic resin plants, dimethylformamide in wash waters from polyurethane processes, etc. The chemical nature of the organic compound is not significant, rather only its boiling point, its solubility in water to the extent of 50 parts per million by weight, and that a mixture of the organic compound and water must not form an azeotrope having a boiling point of less than 212° F. By "solubility" as used herein is meant both true solubility where the organic compound is dissolved in water, and the formation of stable emulsions between the organic compound and water. Hence, the subject invention is applicable to a wide variety of liquid organic compounds including mixtures thereof such as aniline, dimethyl sulfoxide, ethanolamine, amyl acetate, dimethyl acetamide, 1-3, dioxane, and caprolactam. In particular, the subject invention is applicable to aqueous streams containing from 50 to 5,000 parts per million of the aforesaid organic compounds having a boiling point above 212° F.

Adsorbents such as activated carbon, alumina, silica gel, etc., are often used to remove many types of organic materials from aqueous streams. Spent adsorbent is difficult to regenerate when the adsorbate is a high boiling compound. The adsorbent must be either discarded or regenerated in a special furnace. Steam stripping is avoided because of the excessive amounts required for regeneration. In addition, organic content in the resulting steam condensate would be too dilute to justify recovery. In the past, steam stripping has been restricted only to desorbing the more volatile compounds.

The present invention permits economic steam desorption of high boiling compounds. This is accomplished by using a thermocompressor to recycle regenerating steam through the adsorber. The thermocompressor not only improves steam economy but also permits regeneration at improved desorption conditions, that is, lower pressures with a high degree of superheat.

Recirculating steam by thermocompression provides another unique advantage. Organic compounds can be preferentially condensed from the stripping steam to produce a more concentrated mixture of the recovered compound. As the compound is desorbed, it is carried by the steam to a separator. The vapor mixture then passes through cooling coils where the high boiling organics plus a small amount of steam condense. The remaining steam flows to the thermocompressor where it is recycled back to the adsorber. Since only a small amount of recycled steam condenses, a higher organic concentration is obtained in the condensate. As a result thereof, subsequent purification requirements are reduced.

Steam stripping of the adsorption bed can occur at pressures above or below atmospheric pressure. Lower stripping pressure usually improves desorption because of the greater degree of superheat available and the more favorable relative partial pressures of the steam and organic compounds. Auxiliary heating in the adsorber would also be more effective at lower pressures due to the greater temperature differentials between the stripping steam and the auxiliary heating medium. The lower steam temperature which accompanies reduced stripping pressure provides an additional advantage when the adsorbed organic compound is sensitive to heat. The present invention may be applied to either a moving or fixed bed adsorber.

The motive steam required for thermocompression depends on (1) volume of recirculating steam; (2) desorption pressure; (3) system pressure drop; and (4) steam pressure.

Steam condensing in the separator is kept to a minimum in order to attain the highest possible organic content in the condensate. However, sufficient steam must be condensed to ensure adequate removal of the organic compounds from the recirculating steam. A fractionating section below the cooling coils may be desirable when a low relative volatility exists between water and the organic compound.

It is an object of the present invention to provide a novel apparatus and method for recovering organic compounds from aqueous streams.

It is another object of the present invention to provide novel apparatus and method for recovering organic compounds from aqueous streams, wherein the concentrations of the organic compounds are low and the compounds have a boiling point above 212° F.

It is another object of the present invention to provide novel apparatus and method for recovering organic compounds from aqueous streams in a manner which is economic and permits regeneration and improved desorption conditions.

It is another object of the present invention to provide a novel apparatus and process for recovering organic compounds from aqueous streams wherein the compounds are not volatile enough to recover by distillation and too low in concentration to recover economically by evaporation.

Other objects will appear hereinafter.

For the purpose of illustrating the invention, there is shown in the drawings a form which is presently preferred; it being understood, however, that this invention is not limited to the precise arrangements and instrumentalities shown.

The drawing illustrate diagrammatically a typical application of the present invention. Waste water from any one of a variety of processes, including the above-mentioned processes, and containing any of the aforesaid organic compounds having a boiling point above 212° F., and a concentration of between 50 and 5,000 parts per million by weight, which create water pollution problems, enters the system through conduit 10 and is diverted to either the No. 1 adsorber 12 or the No. 2 adsorber 15 which are disposed in parallel. Valve 11 controls flow to adsorber 12 whereas valve 22 controls flow to adsorber 15. The outlets from the adsorbers 12 and 15 are connected to a conduit 14 which directs the clean water back to the process or to a sewer outlet. Discharge from adsorber 12 is controlled by valve 13. Discharge from adsorber 15 is controlled by valve 24.

While adsorber 12 is on stream, adsorber 15 is being regenerated and vice versa. While adsorber 12 is on stream, valves 22 and 24 are closed. Valve 20 in conduit 19 is open, and valve 21 in conduit 19' is closed. High pressure steam is admitted from a supply through conduit 16 to the thermocompressor 17. Steam then flows through conduits 18 and 19 to the adsorber 15.

Each of the adsorbers 12 and 15 is provided with a volume or supply of an adsorber material such as activated carbon, alumina, silica gel or other suitable adsorbent. During the regeneration of adsorber 15, valve 23' in conduit 23 is open. Valve 52 in conduit 50 is closed. Hence, stripping steam flows from the adsorber 15 to the condenser-separator 25. Cooling water flows through coils 26 at a controlled rate to condense the minimum amount of steam. Uncondensed steam flows to the thermocompressor 17 by way of conduit 53. Thereafter, the uncondensed steam is recirculated back to the adsorber 15.

The steam from line 23 carries with it the organic compounds stripped from the adsorbent in adsorber 15 and into the condenser-separator 25 where it is condensed by the cooling coils 26. This condensation results because the organic compound is higher boiling than the water and hence condenses preferentially. Organic compound and water collected at the bottom of condenser-separator 25 is transferred by pump 32 through conduit 33 to an evaporator 34 where it is further purified by removal of water.

Pressure in the system can be controlled either by the flow of cooling water to condensing coils 26, or by steam flow to the thermocompressor 17, or by the flow of excess steam through conduit 27.

If regeneration occurs below atmospheric pressure, noncondensables must be removed from the system continuously. This is accomplished by the steam eductor 28. Noncondensables plus a small amount of steam are drawn into the eductor 28 through conduit 27. The steam and any noncondensables in conduit 27 may flow to condenser 30 where the steam is condensed. Any noncondensed gases from condenser 30 are vented to atmosphere. The condensate from condenser 30 is reintroduced into conduit 10 by way of pump 40 and conduit 43.

When desorption occurs at pressures above atmospheric pressure, any excess steam can be released from the system by way of conduit 36 containing valve 35 to conduit 54. Conduit 54 permits introduction of makeup steam into a reboiler 37 where it provides part of the heat required to further concentrate the organic compounds. Efficiency of the system is improved by utilizing the heat of the steam from conduit 36 to vaporize the condensate recirculated from the evaporator 34, through conduit 60 and pump 65, through reboiler 37 and conduit 56 back to the evaporator 34.

Steam from the evaporator 34 is withdrawn by way of conduit 58 and condensed in condenser 38. The condensate from condenser 38 is withdrawn through conduit 41 connected to the inlet side of pump 39. Condensate from reboiler 37 is withdrawn by way of conduit 42 by the pump 39. Conduit 42 contains a steam trap designated "T." The condensate pumped by pump 39 is returned to the adsorber on stream by way of conduit 64.

The level of liquid within the evaporator 34 is maintained at a predetermined point by a level control, not shown, which enables recovered organic product to be diverted to any storage vessel by way of conduit 62.

As previously mentioned, the system may be operated continuously. When it is desired to strip adsorber 12 and place adsorber 15 on stream, valves 11, 13, 20 and 23' are closed. Also, valves 22, 24, 21 and 52 are opened. Each of the valves may be operated by solenoids so that switching of the adsorber from on stream to stripping may be accomplished by merely manipulating a single electrical switch.

If desired, a packed section or distillation trays can be provided below the cooling coils 26 in condenser-separator 25 to produce a greater degree of fractionation in the condenser-separator 25. Frequently, the motive steam rate for thermocompression will exceed the desired steam condensing rate in the condenser-separator 25. In this case, excess steam will leave the condenser-separator 25 under pressure control and flow to the reboiler 37 where it will provide part of the heat to further process the recovered organic compounds. It will be apparent to those skilled in the art that in place of an evaporator 34, other structures may be utilized such as a distillation column.

The separator 25 may be provided with a demister above the coils 26 if desired.

By way of example and not by way of limitation, economic results may be obtained utilizing steam from the steam supply at 100 p.s.i.g. at approximately 400 pounds per hour. This results in a circulation of 1,000 pounds per hour of steam at a desorption pressure of 7 p.s.i.a. and a system pressure drop of 2 p.s.i. For this operation, 400 lbs./hr. of steam would also be condensed by the cooling coils 26 so that the net flow of steam to the thermocompressor 17 by way of conduit 53 would be 600 lbs./hr. Steam temperature leaving the thermocompressor 17 was 230° F. Lower pressure drops or higher motive steam pressure would naturally decrease steam requirements.

Broad parameters in respect to the steam supply may be used. For example, the steam supply pressure may vary from approximately 100 p.s.i. to 300 p.s.i. The pressure of the steam as it enters the adsorbers 12 and 15 may vary from approximately 5 to 50 p.s.i.a. The pressure drop in the system may vary from one-half to 3 p.s.i.

Either vacuum or pressure regeneration can be employed. Each method has its specific advantage. Vacuum regeneration is used with heat-sensitive materials where high temperature might either decompose or polymerize the adsorbed material. Desorption is also improved at lower pressures. High pressure regeneration, on the other hand, would improve heat transfer to the adsorbent, because of the greater density of the stripping steam. Also, at higher pressures, the excess steam exhausted from the condenser-separator can be used more effectively in subsequent purification operations.

The present invention may be embodied in other specific forms without departing from the spirit or essential attributes thereof.

I claim:

1. A method of recovering an organic compound having a boiling point above 212° F. from an aqueous stream, which organic compound does not form an azeotrope having a boiling point of less than 212° F., comprising providing first and second adsorbers with means for selectively communicating each of said adsorbers with a stripping fluid, passing an aqueous stream containing from 50 to 5,000 parts per million by weight of such organic compound through said first adsorber while stripping said second adsorber in parallel therewith, said stripping of said second adsorber including the steps of circulating steam from a thermocompressor to said second adsorber, said steam being operative to strip the organic compound from said second adsorber, circulating said steam and stripped organic compound from said second adsorber to a condensing and separating zone, condensing a minor portion of the steam to produce a concentrate of the organic compound in water, and recirculating the remainder of said steam back to said thermocompressor.

2. A method in accordance with claim 1 wherein the organic compound concentrate is purified by separating it from water.

3. A method in accordance with claim 1 using a stripping steam pressure of about 5 to 50 p.s.i.a. with a pressure drop of the steam system of about one-half to 3 p.s.i.

4. A method in accordance with claim 3 using a low stripping steam pressure of approximately 7 p.s.i.a. and a pressure drop of the steam system of approximately 2 p.s.i.

* * * * *